United States Patent [19]

Lipman

[11] 4,245,290
[45] Jan. 13, 1981

[54] SLIDING NOTCH PULSE WIDTH MODULATION (PWM)

[75] Inventor: Kenneth Lipman, West Hartford, Conn.

[73] Assignee: United Technologies Corporation, Hartford, Conn.

[21] Appl. No.: 970,765

[22] Filed: Dec. 18, 1978

[51] Int. Cl.$^3$ .............................................. H02M 1/12
[52] U.S. Cl. .................................................... 363/41
[58] Field of Search ..................... 363/41, 42; 318/810, 318/811

[56] References Cited

U.S. PATENT DOCUMENTS

| | | | |
|---|---|---|---|
| 3,423,662 | 1/1969 | Schlabach et al. | 363/41 |
| 3,523,236 | 8/1970 | Howell et al. | 363/42 |
| 3,585,488 | 6/1971 | Gutt et al. | 318/811 X |

*Primary Examiner*—William M. Shoop
*Attorney, Agent, or Firm*—Dominic J. Chiantera

[57] ABSTRACT

The RMS voltage of the output sine wave of a power inverter is regulated by pulse width modulation (PWM) of the rectangular waveform fundamental signal of the inverter bridge with a single sliding notch in each half cycle of the rectangular wave, each notch having a pulse width and position in the wave which is dependent on the required attenuation of the RMS value, and which may be varied, in a continuous manner, between a variable pulse width edge notch, a fixed pulse width notch which slides from an edge notch to a center notch position, and a variable pulse width center notch.

3 Claims, 7 Drawing Figures

SLIDING NOTCH PULSE WIDTH MODULATION (PWM)

BACKGROUND OF THE INVENTION

1. Field of the Invention

This invention relates to voltage regulation in a power inverter, and more particularly to voltage regulation using pulse width modulation (PWM).

2. Description of the Prior Art

The use of PWM to provide voltage regulation and harmonic reduction in the fundamental sine wave provided by an inverter is well known in the art. Briefly stated, known PWM techniques involve chopping the fundamental frequency ($f_0$) rectangular waveform from the inverter bridge with one or more notches in the positive and negative portions in each cycle of the fundamental signal. These notches are fixed in a pattern which positions them at selected electrical degrees ($360° \cdot f_0 \cdot T$) from the positive and negative going transition of the rectangular wave, the notch pattern of the positive portion of the wave representing a mirror image of the notch pattern in the negative portion. The notch pulse widths are similarly defined in electrical degrees and the number of notches, their location and pulse width determine the amplitude of the fundamental sine wave signal and its harmonics, as discussed in detail in U.S. Pat. No. 3,324,376 to J. M. Hunt.

The PWM notch patterns are grouped into the two general categories of edge notch patterns, where the notches are located within 60 degrees from the zero and 180 degree positions of the rectangular waveform period, and center notch patterns which locate the notches plus or minus 30 degrees symmetrically about the 90 and 270 degree positions of the fundamental waveform. Edge notch and center notch PWM waveforms have distinctly different effects on the fundamental signal and harmonic signal amplitudes. The fundamental signal amplitude is far less sensitive to edge notches than to equal number center notches of equal pulse width, whereas the reverse is true of the harmonic signal amplitudes. Depending on the inverter application, i.e. in motor applications the harmonic amplitudes may be of greater concern than the amplitude of the fundamental driving signal, whereas in a precision instrumentation system the voltage amplitude and RMS value of the fundamental may be of far greater concern than the harmonic content, an obvious approach is to select either edge notching or center notching with one or more patterns to provide for a variation in notch location and notch width.

Since edge notch PWM requires pulse widths on the order of twice that required by center notching to produce the same reduction in the fundamental signal voltage amplitude, edge notching provides for less reduction in voltage amplitude which is desirable for heavily loaded inverters where the maximum output voltage is desired. The more coarse center notching has application under different conditions, in inverters having light loads and a high DC input voltage where small variations in the load may result in large amplitude variations of the fundamental, the center notching allowing for restoration of the regulated amplitude within the shorter response time. In some prior art systems, such as power inverters having a wide range of current loads, a combination of both edge notching and center notching are used; however, this requires discrete switching between edge notch and center notch patterns in response to the amplitude changes. This discrete switching results in voltage transients at the output of the inverter which increase the harmonic content of the fundamental and which may result in damage to the inverter load, all of which is undesirable in a power inverter such as that used by a utility providing commercial power.

SUMMARY OF THE INVENTION

The object of the present invention is to provide regulation of the RMS voltage of the output fundamental sine wave of an inverter by PWM of the rectangular wave provided by the inverter bridge, without introduction of even harmonics or voltage transients in the output signal.

According to the present invention, a control signal at a magnitude representative of the desired RMS voltage, as provided by power condition circuitry in the inverter, is presented to an information look-up table which includes sets of stored signal information, each set associated with a particular control signal magnitude and each set definitive of the location and pulse width of a single notch provided in each half cycle of the rectangular waveform from the inverter bridge, the look-up table providing successive sets of signal information associated with successive values of desired RMS voltage response to the magnitude of the control signal, each set being presented to a PWM circuit interconnected between the inverter gate signal source and inverter bridge and responsive to the unmodulated gate signals to provide a sliding notch PWM of each gate signal in response to the information from the table, whereby a single notch in each half cycle of the rectangular wave is varied from a fixed pulse width notch which is variously positioned between an edge notch position and a center notch position, the edge notch pulse width being selectable up to a maximum value, typically 15 degrees, and the center notch pulse width being selectable up to 60 degrees, the information on notch location and pulse width provided by the look-up table defining a single value of RMS magnitude from 100 percent to zero percent.

The voltage regulation of the present invention provides for a continuous linear change in the fundamental signal RMS magnitude without the generation of voltage transients which result from the prior art methods of discrete switching between edge and center notching, in addition to providing an interim regulation by sliding the notch between the edge and center notch positions. The sliding notch PWM of the present invention may be readily adapted to use in existing inverter systems allowing for a simple conversion of the existing system regulation scheme.

These and other objects, features and advantages of the present invention will become apparent in light of the following detailed description of an embodiment thereof, as illustrated in the accompanying drawing.

DETAILED DESCRIPTION

Figure 5:
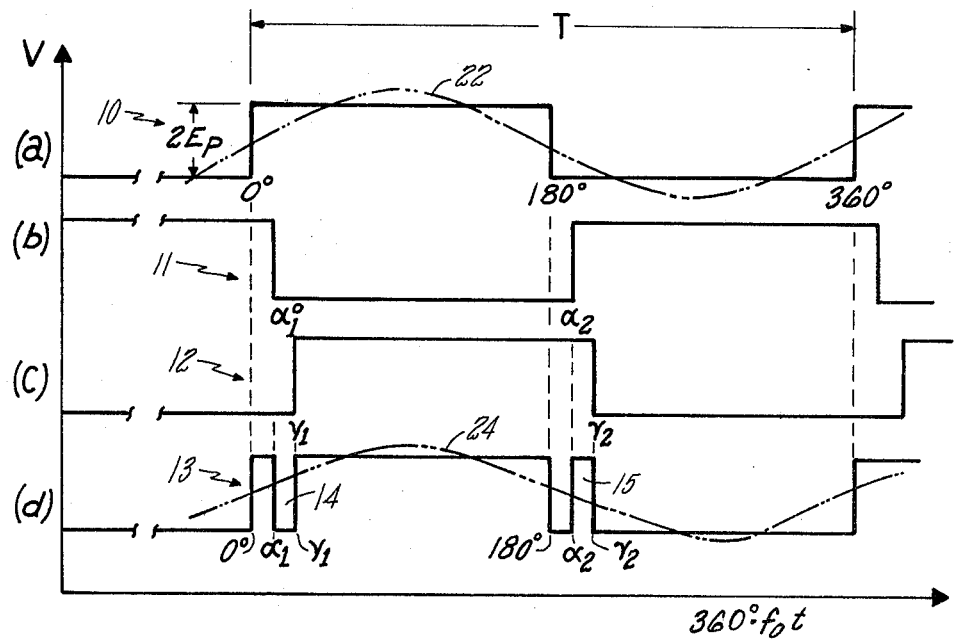
FIG. 5 is an illustration of one set of waveforms used in the description of the operation of the embodiment of FIG. 1.
Figure 6:
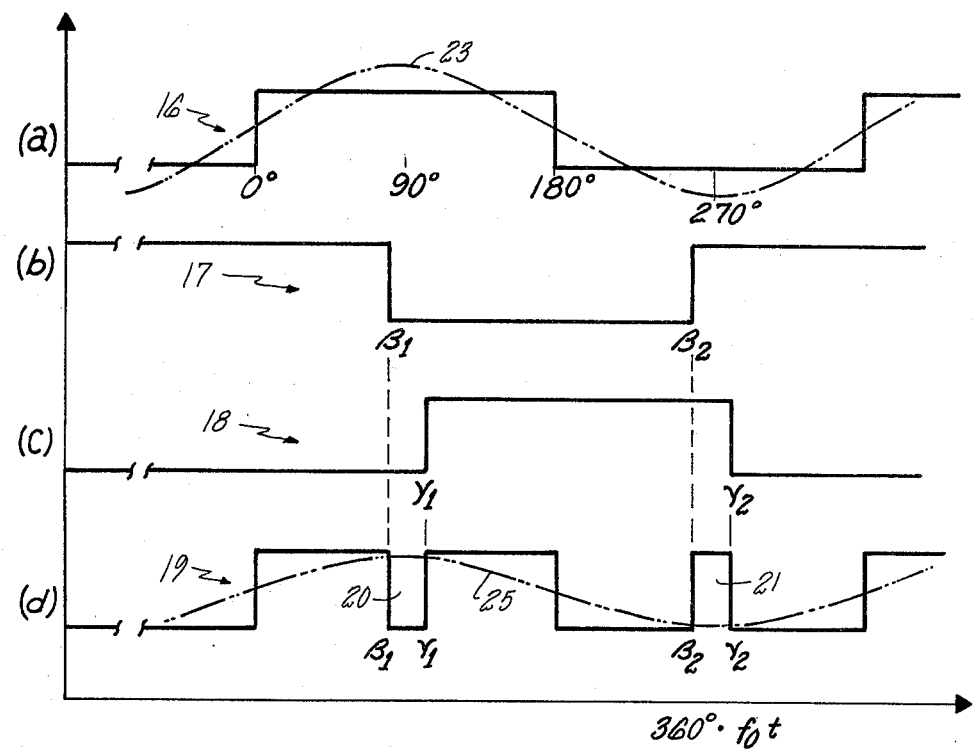
FIG. 6 is an illustration of another set of waveforms used in the description of the operation of the FIG. 1 embodiment.

As known, a signal having a rectangular waveform with equal positive and negative portions, i.e. a square wave, contains only odd signal harmonics of the fundamental frequency. Similarly, as may be shown, a signal having a pulse width modulated waveform which does not introduce any even harmonics of the fundamental can be expressed as the sum of an odd number of square waves of equal frequency. Referring first to FIG. 5, a three square wave summation which provides an edge notch includes a reference square wave 10 (illustration (a)) having a fundamental frequency ($f_0$), a period (T), and 360 electrical degrees ($360°f_0T$). Square waves 11, 12 (illustrations (b), (c)) are phase shifted at selected modulation angles of ($180+\alpha$) degrees and $\gamma$ degrees respectively from the reference wave. For the square wave 11, the 180 degree phase shift is fixed and only the relative phase shift of $\alpha$ degrees is considered. The summation of the three waves 10-12 results in an edge notched waveform 13 (illustration (d)) having identical notches 14, 15 in the positive and negative portions of the wave. Each notch leading edge is at $\alpha$ degrees from the 0 degree and 180 degree positions of the reference wave, and each notch has a pulse width equal to ($\alpha$-$\gamma$) degrees. A similar result is obtained for a center notch by summation of a reference wave 16 (FIG. 6, illustration (a)) with the two phase shifted waves 17, 18 (FIG. 6, illustrations (b), (c)) which are phase displaced by $-(180+\beta)$ degrees and $(+\gamma)$ degrees respectively from the 90 and 270 degree positions of the reference wave. Once again only the relative phase shift of ($-\beta$) degrees for the waveform 17 is considered. Addition of the three waveforms results in a center notched waveform 19 (illustration (d)) having equal identical center notches 20, 21 in each half of the wave. The notches are located symmetrically about the 90 and 270 degree positions of the reference waveform and each have a pulse width equal to ($\beta$-$\gamma$) degrees.

If the reference waves 10, 16 (FIGS. 5, 6, illustration (a)) represent the unmodulated fundamental signal from an inverter bridge, each having a peak amplitude Ep, the resultant sine waves of each (22, 23, shown in phantom) at the inverter output have a peak amplitude ($4/\pi$)Ep and an RMS value of 0.90 Ep. For each PWM wave, the edge notch waveform of FIG. 5 (d) and the center notch waveform of FIG. 6 (d), there is an effective reduction in the RMS value of the resultant sine wave of each (24, 25, shown in phantom) without generation of any even signal harmonics.

Figure 3:
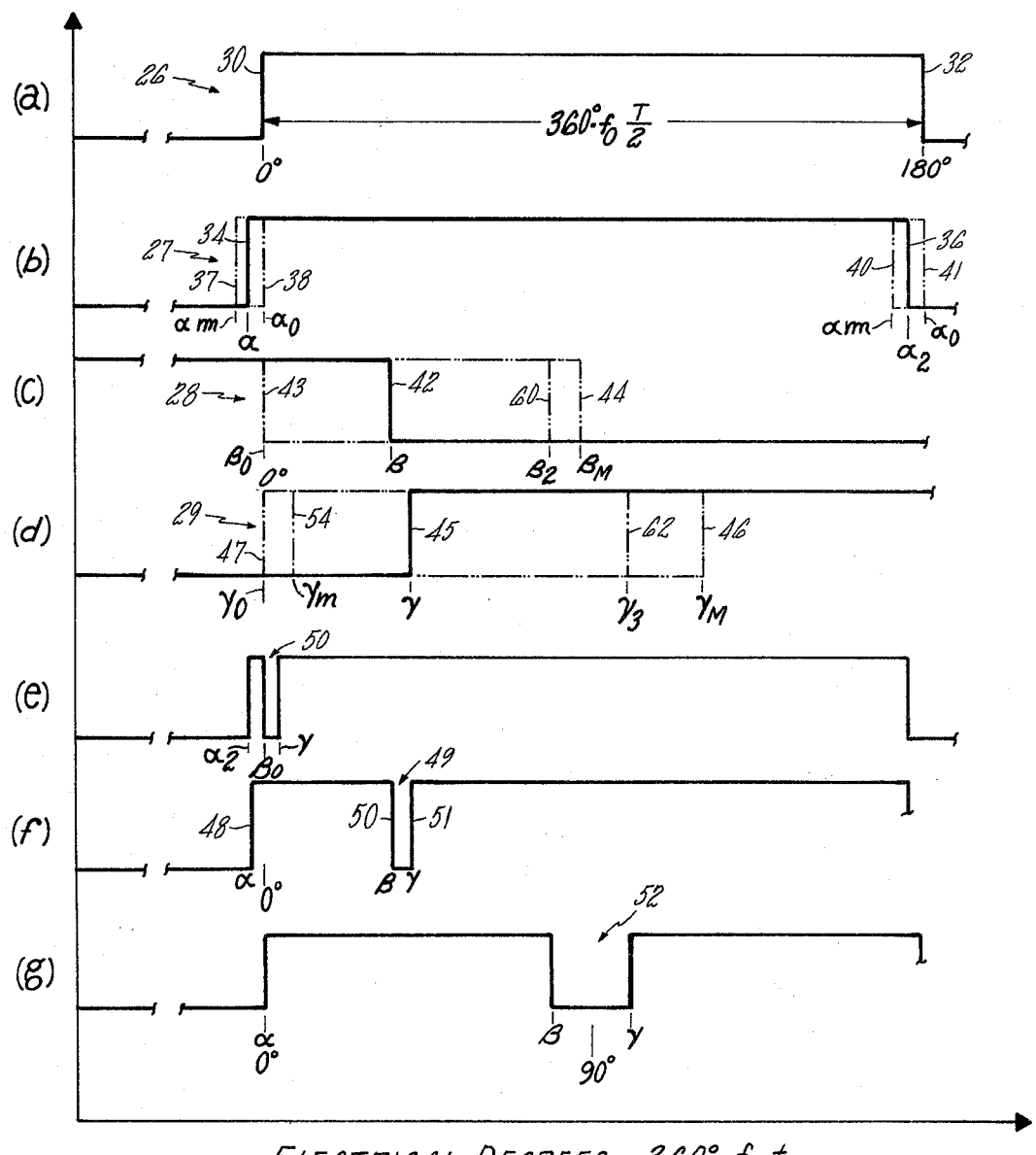
FIG. 3 is a partial illustration of a portion of the operating waveforms of the embodiment of FIG. 1.

In the sliding notch PWM of the present invention, the notch location may vary continuously from an edge notch to a center notch without discontinuous switching of PWM patterns, and without introducing even harmonics of the inverter output fundamental signal. The concept of the sliding notch PWM of the present invention may best be illustrated as a PWM waveform provided by the summation of three phase shifted square waves of equal frequency $f_0$, each having positive and negative transitions which are phase shifted by the different electrical degree values from associated signal transitions of a reference wave, such as the unmodulated fundamental signal. The degree of phase shifting of the three square waves produces the modulation angle and pulse width for the sliding notch PWM waveform. Referring now to FIG. 3, the reference signal 26 (illustration (a)) and the three phase shifted signals 27–29 (illustrations (b) through (d)) are illustrated for only one half cycle, or less, of the waveform period ($360°f_0(T/2)$) since the PWM results in a notch in each half cycle which is the mirror image of the notch provided in the other half cycle, as shown in FIGS. 5, 6.

The half cycle of the reference signal 26 has a positive going transition 30 at 0 degrees and a negative going transition 32 at 180 degrees. The shifted square wave 27, as shown in solid in illustration (b), has a positive going transition 34 at $\alpha_1$ degrees and a negative transition 36 at $\alpha_2$ degrees, where $\alpha_2 - \alpha_1 = 180°$. The values of $\alpha_1$ and $\alpha_2$ are selectable at values in the ranges of $\alpha_o - \alpha_m$ and $\alpha_{o2} - \alpha_{m2}$ respectively, where $\alpha_{o2} - \alpha_o = \alpha_{m2} - \alpha_m = 180°$. This results in shifting the positive and negative transitions 34, 36 between limits, as shown in phantom by the transitions 37, 38 and 40, 41 respectively. The phase shifted square wave 28, shown in solid in illustration (c), has a negative transition 42 at $\beta$ degrees selectable at any angle value in the range $\delta_m(43) - \beta_o(44)$. In illustration (d), the positive transition in the second half cycle (not shown) is at $\beta_2$ degrees, selectable from an equal range of $\beta_{m2} - \beta_{ol}$ displaced by 180° from that of $\beta$ such that $\beta_2 - \beta = 180°$. Finally the third square wave 29, shown in solid in illustration (d), has a positive transition 45 occurring at an angle $\gamma$ selectable at a value in the range $\gamma_m(46) - \gamma_o(47)$ shown in phantom, and a negative transition (not shown) in the second half cycle at an angle selected from the range $\gamma_{m2} - \gamma_{o2}$. For the square waves 27–29, $\alpha_o = \beta_o = \gamma_o = 0$ degrees, and $\alpha_{o2} = \beta_{o2} = \gamma_{o2} = 180$ degrees.

The addition of the three phase shifted square waves at $\alpha$, $\beta$ and $\gamma$ values corresponding to transitions 38, 42, 45, results in the PWM waveform of illustration (f) having a first positive going transition 48 at $\alpha$ degrees and a notch 49 defined between negative transition 50 and positive transition 51 at $\beta$ and $\gamma$ degrees respectively. The pulse width of the notch is E-$\beta$ degrees, and it is approximately centered between 0 and 90 degrees. The selection of values for the three angles from each of their respective ranges results in a family of resultant PWM waveforms from an edge notch 50, as shown in illustration (e), to a center notch 52 as shown in the waveform of illustration (g). The edge notches have a leading edge at 0 degrees and result from the square wave 28 being set at $\beta_o = 0$ degrees and square waves 27, 29 shifted by $\alpha$ and $\gamma$ degrees, where $\alpha = -\gamma$ and $\gamma$ is in the range from $\gamma_o$ to $\gamma_m$ (54, shown in phantom in illustration (d)). The edge notch pulse width is equal to $\gamma$-$\beta_o$ and may vary from 0 degrees (at $\gamma = \gamma_o$) to a maximum ($\gamma = \gamma_m$). If the square wave 27 is set at $\alpha_o = 0°$, the square waves 28, 29 may be set at $\beta$ and $\gamma$ values below and above 90 degrees to provide the center notch 52 at a pulse width $\gamma$-$\beta$ centered on 90 degrees. Similarly, the three angles may be selected at values to provide a PWM waveform with a notch located anywhere between the edge and center notches. In each instance, the resultant PWM waveform contains only odd harmonics of the fundamental frequency.

Figure 4:
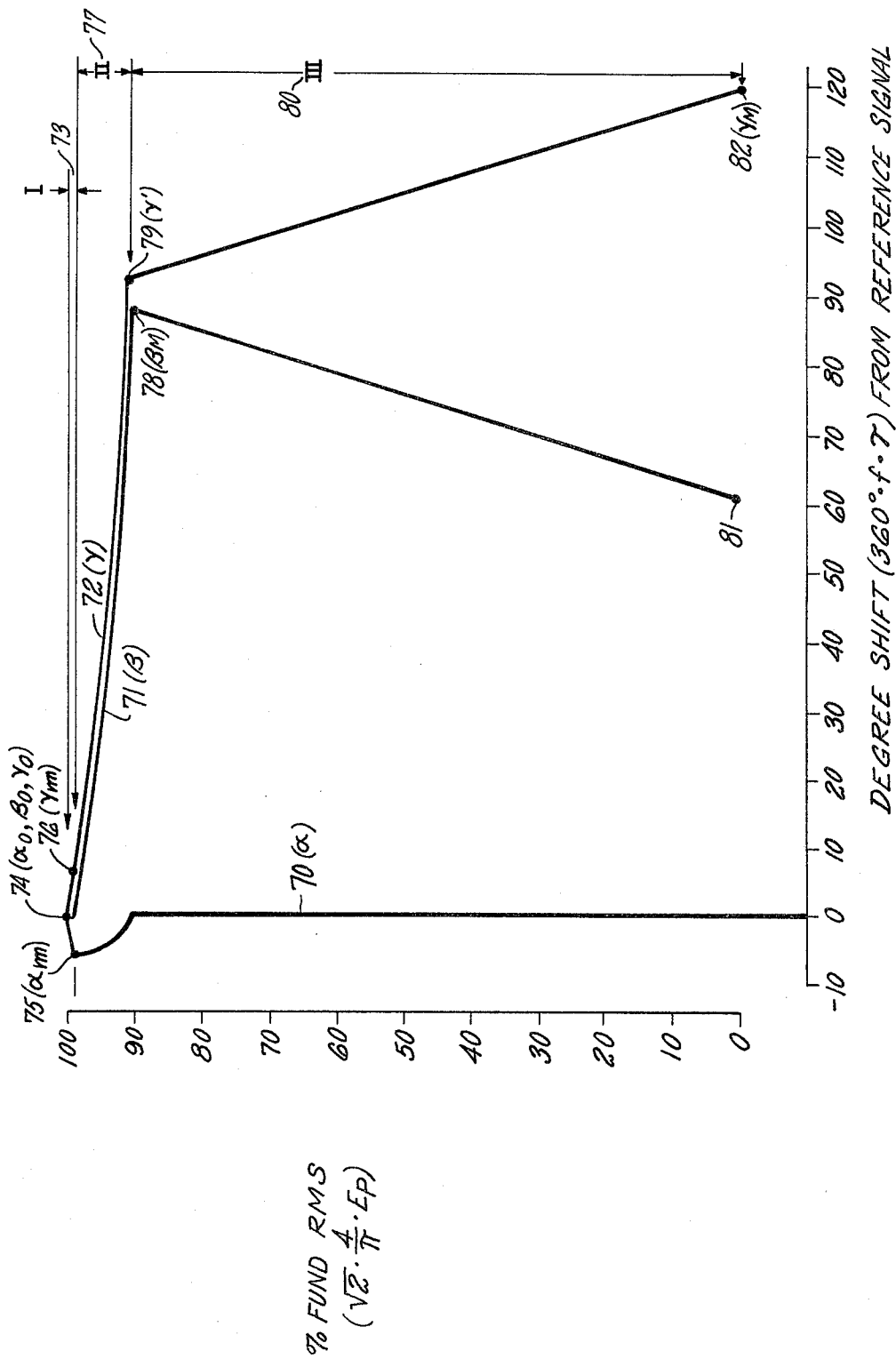
FIG. 4 is a simplified illustration of the characteristics of the sliding notch regulation of the present invention.

In the present sliding notch PWM, the values of the angles ($\alpha$, $\beta$, $\gamma$) are selected to provide continuous modulation of the wave from 100 percent to zero percent fundamental (RMS) over three regions. Each region defines a percentage fundamental RMS to notched PWM relationship beginning with an edge notch having a selectable pulse width up to a maximum degree value, typically 15 degrees, which defines a first region (I), a fixed pulse width notch at a value established by the edge notch pulse width which is variously located from the selected edge notch pulse width position through successive angles to a 90 degree center notch position to define a second region (II), and finally a third region (III) center notch symmetrical about 90 degrees having a selectable pulse width value from that of the notch in region II up to 60 degrees. The percentage RMS to sliding notch PWM schedule, or profile for an exemplary embodiment in which the edge notch pulse width is selectable up to five degrees is illustrated in FIG. 4. The abscissa represents the percentage of the fundamental signal RMS value from 100 percent to zero and the curves 70–72 represent the relationship between degrees phase shift and percentage fundamental for the angles $\alpha$, $\beta$, $\gamma$, respectively, each defining the location of the associated one of the three signal transitions of the phase shifted square waves 27–29 (FIG. 3, illustrations (b)-(d)).

In a first region 73, region I, as illustrated by I area, the three angles are provided at values from $\alpha_o = \beta_o = -\gamma_o = 0$ degrees (74) to $\alpha_m = -5$ degrees, $\gamma_m = +5$ degrees, and $\beta = \beta_o = 0$ degrees, to produce an edge notch which varies from 0 to 5 degrees. Angle $\beta$ is fixed at 0 degrees while $\alpha$ and $\gamma$ are adjusted such that $\alpha = -\gamma$ up to limits $\alpha_m$ (75) and $\gamma_m$ (76) to provide the desired percent fundamental. The edge notch leading edge is at $\beta_o = 0$ degrees and the pulse width is equal to $\gamma - \beta_o$. The displacement of the angle $\alpha$ in a negative direction eliminates incidental phase shift of the fundamental signal.

The relationship between the three angles and the percent fundamental in region I may be illustrated by the mathematical description of the resultant PWM waveform as:

$$f(t) = \sum_{t=0}^{t=T} \sin 2\pi f_o t \cdot (\cos\alpha - \cos\beta + \cos\gamma) + \cos 2\pi f_o t \cdot (\sin\alpha - \sin\beta + \sin\gamma).$$

The cosine term represents incidental phase shift modulation of the fundamental signal $$\left( \text{phase} = \tan^{-1}\left[ \frac{\sin\alpha - \sin\beta + \sin\gamma}{\cos\alpha - \cos\beta + \cos\gamma} \right] \right)$$

and for zero phase shift during the sliding notch PWM of the fundamental the cosine term must be equal to zero, or: $\sin\alpha - \sin\beta + \sin\gamma = 0$. Since in region I the angle $\beta = \beta_o = 0$ degrees, $\sin\beta = 0$ and $\sin\alpha = -\gamma$, or $\alpha = -\gamma$. The percentage change of the fundamental RMS value with the edge notch PWM is tabulated in Table I of Appendix A, where the percentage reduction in fundamental in region I is from 100 percent down to 99.24 percent, or slightly less than a one percent change. When used in an inverter, region I allows for a fine regulatory control over the percentage fundamental for substantially constant inverter loads.

In the second region 77, or region II, the angle $\alpha$ decreases from minus five degrees to zero degrees as the angles $\beta$, $\gamma$ increase from zero ($\beta_o$) 74 and plus five degrees ($\gamma_m$) 76, to 87.5 degrees ($\beta = \beta_m$, 78) and 92.5 degrees ($\gamma = \gamma'$, 79). In this region II, the notch pulse width is fixed at five degrees, such that $\Delta\beta = \Delta\gamma$, and to ensure zero incidental phase shift the angle $\gamma = \sin^{-1} - (\sin\gamma - \sin\beta)$. At the end of region II, $\gamma = 0$ degrees and the notch is symmetrical about 90 degrees to produce a center notch of five degrees. As illustrated in Table I, the change in the percentage fundamental in region II is from 99.24 percent to 91.28 percent, or approximately 10 percent. In region II, the sliding notch PWM provides a ten times greater change in the percentage fundamental than in region I.

In the third region 80, or region III, the angle $\alpha = \alpha_o = 0$ degrees and $\Delta\beta = -\Delta\gamma$. The angle $\beta$ varies between $\beta_m = 87.5$ degrees, (78) and $\beta = 60$ degrees (81) whereas the angle $\gamma$ varies between $\gamma = ' = 92.5$ degrees and $\gamma = \gamma_m = 120$ degrees (82). The percent fundamental (%F) may be expressed in region III as %F = 91.28% [1 − 2 Sin (90% − $\beta$)]. The pulse width of the resultant center notch, which is symmetrical about 90 degrees, varies from five degrees to 60 degrees for a corresponding change in percent fundamental from 91.28 percent to zero percent. Region III represents the highest sensitivity of percent fundamental change to phase shift degrees, whereas region I is the lowest sensitivity. Region II provides an intermediate value sensitivity to the other two regions.

It should be noted that, if preferred, phase modulation of the fundamental may be provided in addition to the sliding notch PWM of the same signal by selection of suitable angular values for $\alpha$. In each region the angle valve $\alpha$ is selected to provide the desired phase modulation after the values of $\beta$ and $\gamma$ are selected to provide the sliding notch PWM, in accordance with the relationship:

$$\text{phase} = \tan^{-1}\left[ \frac{\sin\alpha - \sin\beta + \sin\gamma}{\cos\alpha - \cos\beta + \cos\gamma} \right].$$

Figure 1:
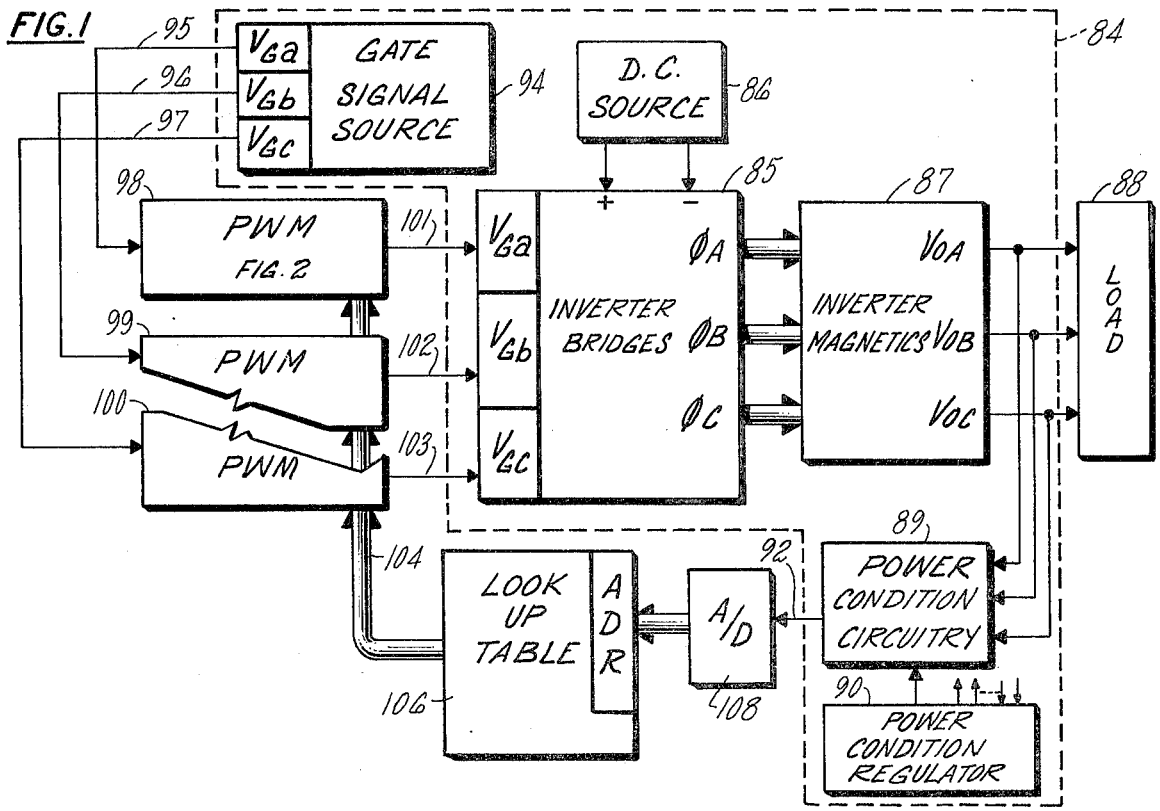
FIG. 1 is a simplified block diagram illustration of one embodiment of the present invention for use in a three-phase power inverter.

As shown so far the RMS value of a fumdamental signal may be regulated in a continuous manner by a sliding notch PWM of the signal. The sliding notch PWM allows for a percent fundamental RMS which is single valued for a given set of angle values for the three phase shifted waves. By controlling the angle $\alpha$, incidental phase shift of the fundamental signal during the sliding notch PWM may be eliminated to reduce undesired power changes in the fundamental. On the other hand phase shift may be introduced in addition to the sliding notch PWM, if desired, by suitably selecting values of $\alpha$ as a function of the angle values selected to produce the sliding notch PWM. FIG. 1 illustrates an exemplary embodiment of the sliding notch PWM of the present invention for use in a typical three-phase inverter 84 of the type which includes one or more inverter bridges 85 receiving input DC power from a DC source 86 to provide rectangular wave fundamental frequency signals in each of three phases $\phi_A$, $\phi_B$, $\phi_C$ which are presented through inverter magnetics 87 to a load 88. The magnetics include an output transformer for coupling the output fundamental signals to the load and may also include frequency filters and harmonic cancellation circuitry. The pole output voltages from the inverter are sine waves in each of the three phases $V_{QA}$, $V_{OB}$, $V_{OC}$, each having peak and RMS values in dependence of the amplitude and RMS value of the inverter bridge fundamental signals. Power condition circuitry 89 monitors the amplitude and phase of the output voltages and in combination with a power condition regulator 90 controls the watts and vars of the output voltages in dependence on load conditions, in a manner well known in the art. The power condition circuitry provides on a line 92 an output command signal representation of the percentage fundamental signal RMS value require to satisfy the load demand at any given time. Gate signals $V_{GA}$, $V_{GB}$, $V_{GC}$ are provided to the bridge 85 to control the firing (turn on, turn off) of the voltage controlled switches (thyristors or transistors) in each of the three phase outputs of the bridge. In the absence of any PWM, the gate signals are provided as square waves from a gate signal source 94 which presents each through lines 95–97 to the gate inputs of the bridge, however, in FIG. 1, PWM circuits 98–100 are inserted, one for each of the lines, each receiving an associated one of the three gate signals $V_{Ga}$, $V_{Gb}$, $V_{Gc}$.

The PWM circuits are identical and each provide the sliding notch PWM of the square wave gate signal appearing on the associated line from the gate signal source. Each PWM circuit provides a sliding notch PWM output signal on an associated one of the lines 101–103 to the gate input of the bridges. The notch is provided in response to notch information presented to the PWM circuit describing the location and pulse width of the notch, either in degrees or as a series of time delays from a selected reference.

In an embodiment where the information is presented to each PWM circuit, as groups of time delays, each delay is associated with one of the three angles, such that:

$$\tau_{d1} = \frac{\alpha}{360° \cdot f_o}, \tau_{d2} = \frac{\beta}{360° \cdot f_o}, \tau_{d3} = \frac{\gamma}{360° \cdot f_o}.$$

Each delay is measured from a reference, such as the unmodulated gate signal provided from the source 94 where the delay is measured from the positive and negative going transitions of the unmodulated wave. The time delay information is presented to each PWM through lines 104 from a look-up table 106, such as a programmable read only memory (PROM) which may comprise a number of parallel PROMs to provide the required bit capacity. The bit capacity required is dependent on both the accuracy and linearity required for the sliding notch in a particular system. The word bit length defining each delay is selected to establish the necessary accuracy for each time delay value, and the number of words stored for each delay determines the linearity or granularity of the sliding notch, i.e. the steps between angle values. The higher the number of stored values for each time delay value, the more linear the sliding notch function.

As with the angle values illustrated in FIG. 4, the time delay values are single valued for a given percentage reduction of fundamental. The PROM 106 provides each group of three time delay values in response to an address provided from an analog to digital (A/D) converter 108 which converts the analog percentage fundamental signal on the line 92 from the power conditioner circuitry into a digital word representative of an address location in the PROM at which the three time delay values corresponding to the given percent fundamental signal magnitude are stored.

The sliding notch PWM circuits may be provided in any one of a number of different embodiments, as may be known to those skilled in the art. In one embodiment for the PWM circuit 98 illustrated in FIG. 2, the time delay values $\tau_{d1}$, $\tau_{d2}$ and $\tau_{d3}$ are successive delays, i.e. the first delay $\tau_{d1}$ is reference to the unmodulated gate signal on the line 95, the second time delay $\tau_{d2}$ is referenced to the first time delay and the third time delay value referenced to the second time delay. The effect is to provide cascaded time delays, each a function of the unmodulated gate signal which is used as a reference time base.

Figure 2:
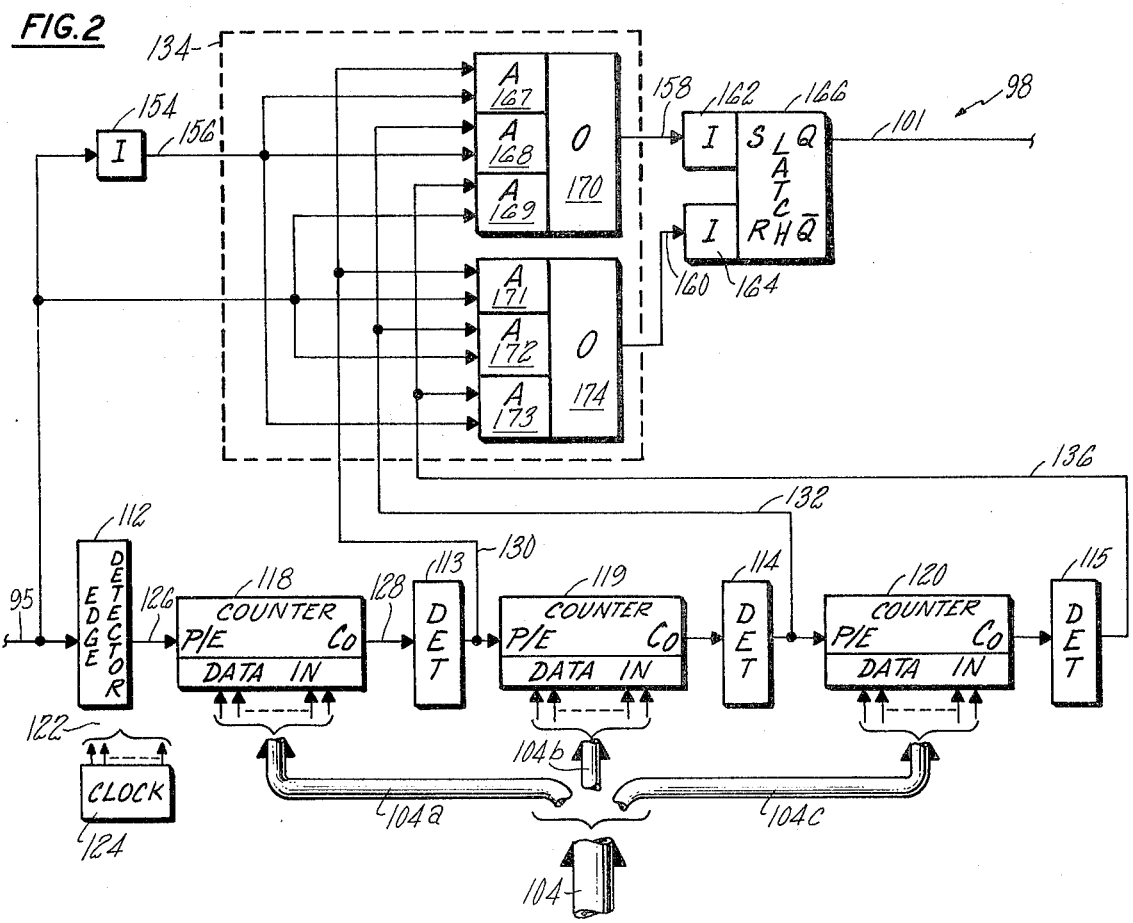
FIG. 2 is a block diagram illustration of one embodiment of PWM apparatus as may be used in the embodiment of FIG. 1.
Figure 7:
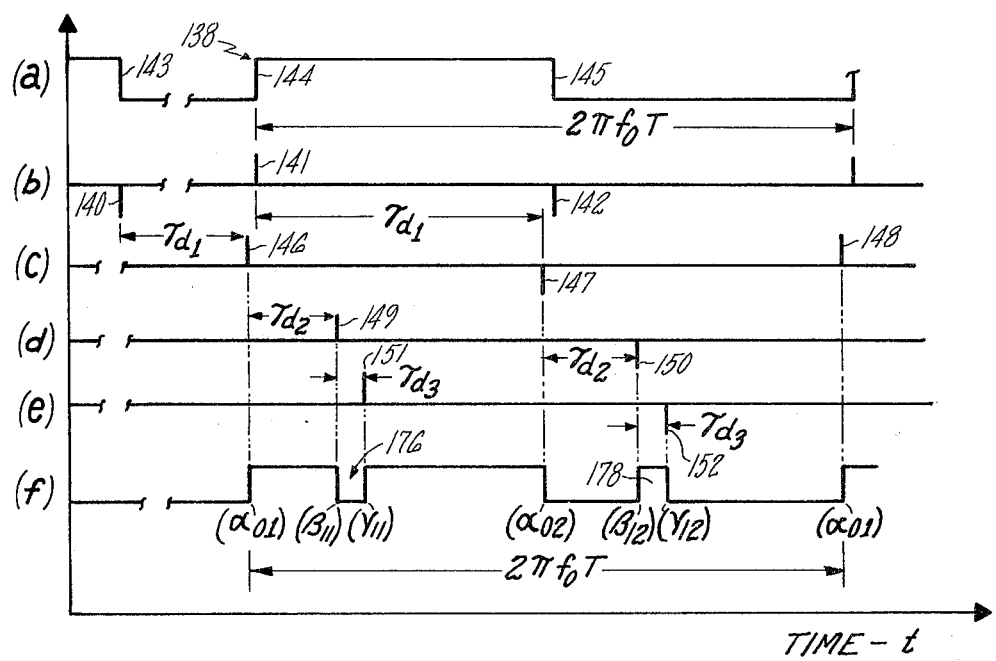
FIG. 7 is an illustration of the operating waveforms of the embodiments of the PWM apparatus illustrated in FIG. 2.

Referring to FIG. 2 the PWM 98 receives an unmodulated gate signal, as shown in FIG. 7, illustration (a), on the line 95. The gate signal is presented to an edge detector circuit 112 which is the first element in a series-connected arrangement of edge detector circuits 112–115 and synchronous counters 118–120. The edge detectors may comprise any one of a number of known circuit configurations for providing edge detection, such as a digital edge detector using dual flip flops clocked by a clock signal provided on lines 122 from a system clock 124, the outputs of which are presented to the two inputs of an exclusive OR gate, or it may comprise an analog differentiator. Each of the synchronous counters receive the clock signal on the lines 122 (connection not shown) and each may comprise a plurality of series-connected counters, such as the National Semiconductor Model 74161J four bit counter, to provide the required bit count in the particular application. As shown, the output of the edge detector 112 is connected through a line 126 to the preset/enable (P/E) input of the counter 118 which in turn has its carry out ($C_o$) connected through a line 128 to the input of the edge detector 113. Similarly the outputs of edge detectors 113, 114 are connected through lines 130, 132 to the P/E inputs of counters 119, 120 and to two inputs of a logic decoding circuit 134. The $C_o$ outputs of the counters 119, 120 are connected to the inputs of edge detectors 114, 115 and the outputs of edge detector 115 is presented through a line 136 to another input of the logic decoding circuit 134. Each counter has a data input which permits loading of a preset count such that the counter, when enabled, counts from the preset count up to the maximum count ($C_o$). In the embodiment of FIG. 2, the actual time delays $\tau_{d1}$, $\tau_{d2}$ and $\tau_{d3}$ are established as the time required by the counter to count at the clock frequency from the preset count value loaded in the counter to the maximum count. The preset count values are provided from the PROM 106 through lines $104_a$–$104_c$ included within the lines 104.

The operation of the cascaded edge detectors and counters may best be understood by reference to the illustrations of FIG. 7. The unmodulated gate signal (138, illustration (a)) is received by the detector 112 which provides pulses 140–142 in response to the waveform transitions 143–145 of the gate signal. Each pulse provides a preset/enable of the counter 118 such that the counter begins counting from the preset count established at the data input up to the maximum count $C_o$. The counter 118 provides a discrete step output on the line 128 in response to each full count. Each step is detected by detector 113 which provides a pulse in response to each on the line 130, as shown by the pulses 146-148 in illustration (c). The real lapse time between each of the pulses 140-142 from the detector 112 and each of the succeeding pulses 146-148 from the detector 113 correspond in value to the delay $\tau_{d1}$, as indicated in FIG. 7.

Each pulse from the detector 113 provides a preset-/enable of the counter 119 which counts from the preset count provided on the line $104_b$ up to the $C_o$ count. Each $C_o$ count from counter 119 is detected by detector 114 which provides a discrete pulse in response to each on the line 132, as shown by pulses 149, 150 of illustration (d), each separated in time by $\tau_{d2}$ from the pulses appearing on the line 130. The pulses on the line 132 similarly preset/enable the counter 120 which counts from the preset value to the $C_o$ count. The detector 115 provides a discrete pulse on the line 136 in response to each full count, as shown by pulses 151, 152 of illustration (e), each separated in time by $\tau_{d3}$ from the associated preceding pulse on the line 132.

The pulses on the lines 130, 132 and 136 are presented to the logic decoding circuitry 134, which also receives the unmodulated gate signal appearing on the line 95 and the inverted gate signal provided from an invert gate 154 on the line 156. The decoding circuitry 134 provides SET and RESET discrete signals through lines 158, 160 and invert gates 162, 164 to the SET and RESET inputs of a latch 166, by decoding the discrete pulses on the lines 130, 132 and 136 in combination with the gate signal and inverted gate signal on the lines 98, 156. Decoding is provided through SET logic gates including AND gates 167-169 connected to an OR gate 170, and RESET logic including AND gates 171-173 connected to an OR gate 174. The decode logic circuit, as may be readily apparent to one skilled in the art from the detailed interconnection diagram of FIG. 2, decodes the pulses on the lines 130, 132, 136 to provide at the output of the latch 166 on the line 101 the pulse width modulated gate signals. Decoding pulses 146-152 results in the PWM gate signal 175 of illustration (f) having notches 176, 178 in each of the positive and negative halves of the waveform. Each notch having a pulse width equal to $\beta-\gamma$ degrees.

The time delay information presented to the PWM circuits 98-100 is provided asynchronously, in response to a change in the percent fundamental signal on the line 92 (FIG. 1). The percentage fundamental signal is continuously updated as a function of the load demand on the inverter. Each percentage fundamental signal is converted in the A/D converter 108 into an address of the look-up table (PROM) 106 which provides the three time delay values stored at that address through the lines 104 to the sliding notch PWM circuits. Each PWM circuit responds to the time delay values as they appear, which in the embodiment of FIG. 2 are represented as preset count values. Each of the counters provide a count from the preset value established by the PROM 106 up to the maximum count $C_o$ at a frequency equal to that of the clock signal on the lines 122, each counter being enabled in sequence by discrete pulses from a preceding counter or from the unmodulated gate signal appearing on the line 95. As such the change in notch location and notch pulse width is continuous, each dependent on the desired percent fundamental signal RMS value. The notch location varies, i.e. sliding notch, from an edge notch having a maximum pulse width of 5 degrees and centered at 2.5 degrees of the unmodulated gate signal reference, through to a center notch having a pulse width from 5 to 60 degrees and centered at 90 degrees of the gate reference signal. The percent change in fundamental for the sliding notch PWM is single valued for each notch location and pulse width, such that there is a single notched PWM waveform for each percent fundamental from 100 percent to zero percent. This allows for a continuous change in the fundamental signal RMS value without discrete switching between edge notch and center notch patterns as in the prior art, and without generation of even harmonics of the fundamental.

The sliding notch PWM of the present invention may, if preferred, be implemented in any one of a number of known analog embodiments which provide for the implementation of the summation of the three phase displaced waveforms ($\alpha$, $\beta$, $\gamma$) illustrated in FIG. 3. The phase angle values may similarly be translated to time delay values relative to the unmodulated gate signal, such that one equivalent analog embodiment could provide for successive time delays, i.e. cascaded function, in the manner described hereinbefore. Similarly, the edge notch pulse width, although illustrated in FIG. 4 as a selectable pulse width up to five degrees, may be selectable up to a maximum value of 15 degrees, whereupon the sliding notch begins above 15 degrees, and with a 15 degree pulse width, slides back and forth from the edge notch to the center notch position in response to the required change in fundamental RMS.

TABLE I
APPENDIX A

| REGION | ANGLES (DEGREES) | | | % FUNDAMENTAL |
|---|---|---|---|---|
| | $\alpha$ | $\beta$ | $\gamma$ | |
| I | 0 | 0 | 0 | 100.00 |
| | −1.0 | 0 | 1.0 | 99.97 |
| | −2.0 | 0 | 2.0 | 99.88 |
| | −3.0 | 0 | 3.0 | 99.72 |
| | −4.0 | 0 | 4.0 | 99.51 |
| | −5.0 | 0 | 5.0 | 99.24 |
| II | −4.986 | 2.5 | 7.5 | 98.86 |
| | −4.962 | 5.0 | 10.0 | 98.49 |
| | −4.886 | 10.0 | 15.0 | 97.75 |
| | −4.623 | 20.0 | 25.0 | 96.34 |
| | −4.219 | 30.0 | 35.0 | 95.04 |
| | −3.669 | 40.0 | 45.0 | 93.90 |
| | −3.044 | 50.0 | 55.0 | 92.94 |
| | −2.306 | 60.0 | 65.0 | 92.18 |
| | −1.503 | 70.0 | 75.0 | 91.65 |
| | −0.652 | 80.0 | 85.0 | 91.34 |
| | 0.0 | 87.5 | 92.5 | 91.28 |
| III | 0.0 | 85.0 | 95.0 | 82.57 |
| | 0.0 | 80.0 | 100.0 | 65.27 |
| | 0.0 | 75.0 | 105.0 | 48.24 |
| | 0.0 | 70.0 | 110.0 | 31.60 |
| | 0.0 | 65.0 | 115.0 | 15.48 |
| | 0.0 | 60.0 | 120.0 | 00.00 |

Although the invention has been shown and described with respect to an exemplary embodiment thereof, it should be understood by those skilled in the art that the invention may be practiced in a wide variety of configurations and utilizations, some of which are described hereinbefore, and that the foregoing and various other changes, omissions and additions may be made in and to the invention without departing from the spirit and the scope thereof.

Having thus described an embodiment of my invention, that which I claim as new and desired to secure by Letters Patent is:

1. Apparatus for regulating the RMS voltage value of an output sine wave signal from an inverter by pulse width modulation of the rectangular output signal of the inverter bridge in response to a control signal at a magnitude representative of a selected RMS value, the bridge providing the output signal at a waveform and frequency in dependence on rectangular waveform gate signals presented from a gate signal source to a gate input of the bridge, the apparatus comprising:

look-up table means for storing a plurality of information sets and responsive to the control signal presented thereto, each information set being associated with a particular control signal magnitude and each information set defining the pulse width and location of a single pulse width modulation notch with respect to each half cycle of the rectangular waveform gate signals, said look-up table means providing the associated one of said plurality of information sets at an output thereof in response to the presence of the particular control signal magnitude at an input thereof; and pulse width modulation means, interconnected between the inverter gate signal source and the inverter bridge and responsive to the rectangular gate signals and to said information sets from said look-up table means, for providing pulse width modulation of the gate signals with a single pulse width modulation notch at a pulse width and location in each half cycle in dependence on that defined by a present information set, said modulation means presenting said modulated gate signal to the inverter bridge to provide pulse width modulation of the output signal in dependence thereof.

2. The apparatus of claim 1, wherein said look-up table provides, in response to the presence of successive control signal magnitude representative of RMS values in each of three successive regions, successive information sets in each of three successive groups of information sets, each group being associated with a corresponding one of said three regions including a first group defining a pulse width modulation edge notch associated with a first region representative of higher RMS values, a second group defining a pulse width modulation sliding notch associated with a second region representative of intermediate RMS values, and a third group defining a pulse width modulation center notch associated with a third region representative of lower RMS values.

3. The apparatus of claim 2, wherein said look-up table provides said successive information sets from a first set to a second set in each of said three groups in response to the presence of successive control signal magnitudes from a maximum RMS value to a minimum RMS value in each of said three regions, successive information sets of said first group from said first set to said last set defining an edge notch having succeedingly higher pulse width values up to a selected maximum value, successive information sets of said second group from said first set to said second set defining a sliding notch having a fixed pulse width equal to the maximum value selected for said edge notch and centered at successive locations extending from the location of the maximum pulse width edge notch to a center notch location at ninety degrees, and successive information sets of said third group from said first set to said last set defining a center notch located at ninety degrees having succeedingly higher pulse width values from that of said sliding notch up to a maximum of sixty degrees.

* * * * *

UNITED STATES PATENT AND TRADEMARK OFFICE
CERTIFICATE OF CORRECTION

PATENT NO. : 4,245,290
DATED : January 13, 1981
INVENTOR(S) : Kenneth Lipman

It is certified that error appears in the above-identified patent and that said Letters Patent are hereby corrected as shown below:

Column 4, line 31 "$\delta_m(43)-\beta_o(44)$" should be --$\beta_m(43)-\beta_o(44)$--.

Column 4, line 37 "$\gamma_m(46)-\gamma_o(47)$" should be --$\gamma_M(46)-\gamma_o(47)$--.

Column 4, line 48 "E-β" should be --γ-β--.

Column 6, line 21 "$\gamma='=92.5$" should be --$\gamma=\gamma'=92.5$--.

Column 6, line 37 "valve" should be --value--.

Column 7, line 4 "$V_{QA}$" should be --$V_{OA}$--.

*Signed and Sealed this*

*Fourteenth* Day of *April 1981*

[SEAL]

*Attest:*

RENE D. TEGTMEYER

*Attesting Officer*     *Acting Commissioner of Patents and Trademarks*